(12) United States Patent
Hubscher

(10) Patent No.: US 6,557,330 B2
(45) Date of Patent: May 6, 2003

(54) BELLY MOWER PARTICULARLY FOR AN ATV TYPE VEHICLE

(75) Inventor: Darin Hubscher, Swan River (CA)

(73) Assignee: Quadivator Inc., Manitoba (CA)

( * ) Notice: Subject to any disclaimer, the term of this patent is extended or adjusted under 35 U.S.C. 154(b) by 145 days.

(21) Appl. No.: 09/747,520

(22) Filed: Dec. 22, 2000

(65) Prior Publication Data

US 2002/0078672 A1 Jun. 27, 2002

(51) Int. Cl.[7] .......................... A01D 34/64; B60K 17/28
(52) U.S. Cl. .................... 56/10.8; 56/15.8; 180/53.4
(58) Field of Search .................... 56/10.6, 11.6, 56/13.6, 14.7, 14.9, 15.6, 16.3, 17.1, DIG. 9, DIG. 4; 280/481, 455.1, 498, 492; 172/297, 288; 180/53.1, 53.4

(56) References Cited

U.S. PATENT DOCUMENTS

| | | | |
|---|---|---|---|
| 3,118,266 A | * | 1/1964 | Colburn |
| 3,245,209 A | * | 4/1966 | Marek |
| 4,577,712 A | | 3/1986 | Foote et al. |
| 4,914,894 A | * | 4/1990 | Geiger |
| 5,381,647 A | | 1/1995 | Eberle |
| 5,433,066 A | * | 7/1995 | Wenzel et al. |
| 5,816,033 A | * | 10/1998 | Busboom et al. |
| 5,988,294 A | | 11/1999 | Hubscher |
| 6,176,071 B1 | * | 1/2001 | Thorman et al. |
| 6,178,668 B1 | | 1/2001 | Gustafson et al. |

FOREIGN PATENT DOCUMENTS

AU        738825        9/2001

* cited by examiner

*Primary Examiner*—Robert E. Pezzuto
(74) *Attorney, Agent, or Firm*—Adrian D. Battison; Michael R. Williams; Ryan W. Dupuis

(57) ABSTRACT

A belly mower is provided for attachment to a vehicle of the ATV type. The mower includes a mower deck having a horizontal mounting plate and a depending skirt with a plurality of blades each mounted on a vertical shaft at spaced positions across the deck. The deck is shaped arranged such that it can be located behind the two front wheels of the vehicle and in front of the two rear wheel of the vehicle. The deck includes a rearwardly extending mounting arm for attachment of the deck to a rear hitch of the vehicle such that forward movement of the vehicle moves the deck forwards and maintains the deck between the front and rear wheels. The deck is also connected to the vehicle to prevent side to side movement of the deck. A motor separate from a motor of the vehicle is provided and carried rearwardly of the vehicle on the end of the support arm behind the hitch and includes a pulley and single drive belt arranged to pass along the support arm and wrap around a drive pulley on each mounting shaft for driving the blades. A control system attached to the support arm and extends upwardly to a control box so as to be operable by a person seated on the vehicle for controlling the motor and an electric clutch.

16 Claims, 6 Drawing Sheets

//BELLY MOWER PARTICULARLY FOR AN ATV TYPE VEHICLE

This invention relates to a belly mower for attachment to a vehicle in a location between the wheels for movement with the vehicle over the ground for carrying out a mowing action on the ground. The mower is particularly designed for use with an ATV type vehicle, that is a cycle having three or four wheels where the front wheel or wheels are steered by handle bars, but can be used for any vehicle.

BACKGROUND OF THE INVENTION

Light duty mowers generally of the order of 36 inches to 54 inches in width are commonly required by the average householder for moving the grass of larger yards. Many mowers of this type are designed for use with yard tractors where the mower is attached to the yard tractor at a position underneath the vehicle and between the wheels in a "belly" mount position and this is particularly convenient for manoeuvrability. The primary task of such yard tractors is often the mowing action and therefore the tractor is designed specifically to receive the mower and generally includes a belt drive arrangement or hydraulic drive arrangement which provides power to the mower and particularly the blades of the mower carried on a horizontal deck of the mower. Often the mower can be detached and removed for use of the tractor for other purposes such as snow removal, cultivation and the like. However, as the primary use of the tractor is often for mowing, it is designed with the mower in mind and therefore provides sufficient clearance and provides suitable mounting arrangements for attachment to the mower.

ATV type vehicles, that is a cycle having three or four wheels where the front wheels are steered by handle bars are available for recreational uses and their primary function is for cross country travel. However many owners of such vehicles want to use the vehicle for other purposes and one example is that of mowing. The use for other such purposes often justifies the cost of the initial vehicle giving the owner the ability to utilize the vehicle for recreational use, for long distance travel over rough terrain and also for working functions around the home such as mowing and cultivation.

The present inventor has therefore provided a design of a cultivator suitable for attachment to an ATV type vehicle and this has achieved considerable success. The device is shown in U.S. Pat. No. 5988294 issued Nov. 23, 1999.

Mowers are available for attachment to an ATV type vehicle and generally these are towed behind the vehicle by attachment to a hitch at the rear of the vehicle. As ATV vehicles do not generally have a power output system such as a power take off shaft, it is generally necessary to provide a separate motor on the mower. Tow behind mowers thus mount the motor directly on top of the deck so that it is supported by the deck in the rolling action of the deck across the ground. These devices have achieved considerable success and the mower is widely sold as a trail behind equipment for attachment to the ATV.

However the trail behind mower has the disadvantage that it has reduced manoeuvrability since it follows in the form of a trailer. In addition since the mower is behind the vehicle, it is necessary for the user to continually turn to watch the mowing action and to ensure that the mower follows the required path. This turning is uncomfortable for the operator.

SUMMARY OF THE INVENTION

It is one object of the present invention, therefore to provide a belly mower which is particularly but not exclusively designed for attachment to a light towing vehicle such as an ATV.

According to one aspect of the invention there is provided a belly mower for attachment to a vehicle comprising:
a mower deck;
at least one blade mounted on the deck such that forward movement of the deck across the ground causes the blade to effect a cutting action of a crop growing on the ground;
the deck being shaped arranged such that it can be located behind at least one front wheel of the vehicle and in front of at least one rear wheel of the vehicle;
the deck including mounting members for attachment of the deck to the vehicle such that forward movement of the vehicle moves the deck forwards and maintains the deck between the front and rear wheels;
a motor attached to the deck and separate from a motor of the vehicle for driving the at least one blade;
and a control system attached to the deck and operable by a person seated on the vehicle for controlling the driving of the at least one blade by the motor.

As ATV type vehicles generally do not include a power output such as a PTO, the mower preferably includes its own power source preferably an internal combustion motor carried on the mower at a position outboard of the ATV structure.

Preferably there is provided a support arm carrying the motor and extending longitudinally of the vehicle from the deck to a position beyond the vehicle for supporting the motor at the position outboard of the vehicle. This arm preferably extends to the rear so that the motor is behind the vehicle but other locations can be used such as in front of the vehicle. The location of the deck under the belly of the vehicle prevents the motor from being located in its more normal position on top of the deck.

Preferably the support arm includes a ground wheel outwardly of the vehicle which acts as skid member to prevent grounding of the outermost end of the arm over rough terrain.

Preferably the arm includes a mounting member which is arranged for is attachment to the vehicle for propelling the mower. Where the arm extends to the rear, the arm preferably attaches to the rear hitch of the vehicle and thus can pivot upwardly and downwardly to accommodate changes in ground level. Preferably there is provided a second mounting member for holding the deck against side to side movement relative to the vehicle.

Preferably the control system includes a mounting stand which may be attached to the support arm extending to a height for operation by the seated person.

Preferably the motor includes a drive pulley at the support arm for driving a belt extending along the drive arm to the deck for driving the at least one blade.

Preferably there is a plurality of blades each rotatable on a respective drive shaft about a substantially vertical axis at horizontally spaced positions across the deck. Each drive shaft may include a single drive pulley thereon wherein the belt extends from the pulley on the motor around each in turn of the drive pulleys of all of the blades. This arrangement minimizes the height of the deck and drive arrangement for locating the deck in the small clearance available under the vehicle and for allowing the vehicle to drive over the deck for locating the deck in the area between the front and rear wheels.

Preferably there is provided a lift operator for lifting a forward part of the deck for transport.

According to a second aspect of the invention there is provided a belly mower for attachment to a vehicle comprising:

a mower deck;

at least one blade mounted on the deck such that forward movement of the deck across the ground causes the blade to effect a cutting action of a crop growing on the ground;

the deck being shaped arranged such that it can be located behind at least one front wheel of the vehicle and in front of at least one rear wheel of the vehicle;

the deck including support arm arranged to extend longitudinally rearwardly of the vehicle from the deck to a position behind the vehicle;

the support arm including a hitch coupling for attachment to a rear hitch of the vehicle for attachment of the deck to the vehicle such that forward movement of the vehicle moves the deck forwards and maintains the deck between the front and rear wheels.

Preferably the deck is propelled forwardly by the hitch coupling and includes a second mounting member extending from a forward. part of the deck to the vehicle to prevent side to side movement of the deck relative to the vehicle.

According to a third aspect of the invention there is provided a belly mower for attachment to a vehicle comprising:

a mower deck;

a plurality of blades mounted on the deck such that forward movement of the deck across the ground causes the blade to effect a cutting action of a crop growing on the ground, each blade being rotatable on a respective mounting shaft about a substantially vertical axis at horizontally spaced positions across the deck;

the deck being shaped arranged such that it can be located behind at least one front wheel of the vehicle and in front of at least one rear wheel of the vehicle;

the deck including mounting members for attachment of the deck to the vehicle such that forward movement of the vehicle moves the deck forwards and maintains the deck between the front and rear wheels;

a drive shaft attached to the deck for driving the blades including a drive pulley mounted on the drive shaft for driving a belt extending to the deck for driving the blades;

wherein each mounting shaft includes a single drive pulley thereon and wherein the belt extends in a common horizontal plane from the pulley on the drive shaft around each in turn of the drive pulleys of all of the blades.

Preferably the drive shaft is connected directly to a drive motor with the pulley thereon at a bottom of the drive shaft.

Preferably the deck includes a horizontal mounting plate on which the mounting shafts are mounted for rotation about vertical axes passing through the mounting plate with the blades underneath the mounting plate and the pulleys above the mounting plate, all of the pulleys and the belt being covered by a common cover plate parallel to the mounting plate.

A further aspect of the invention is defined by the combination of a vehicle and the mower as defined above.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 2:
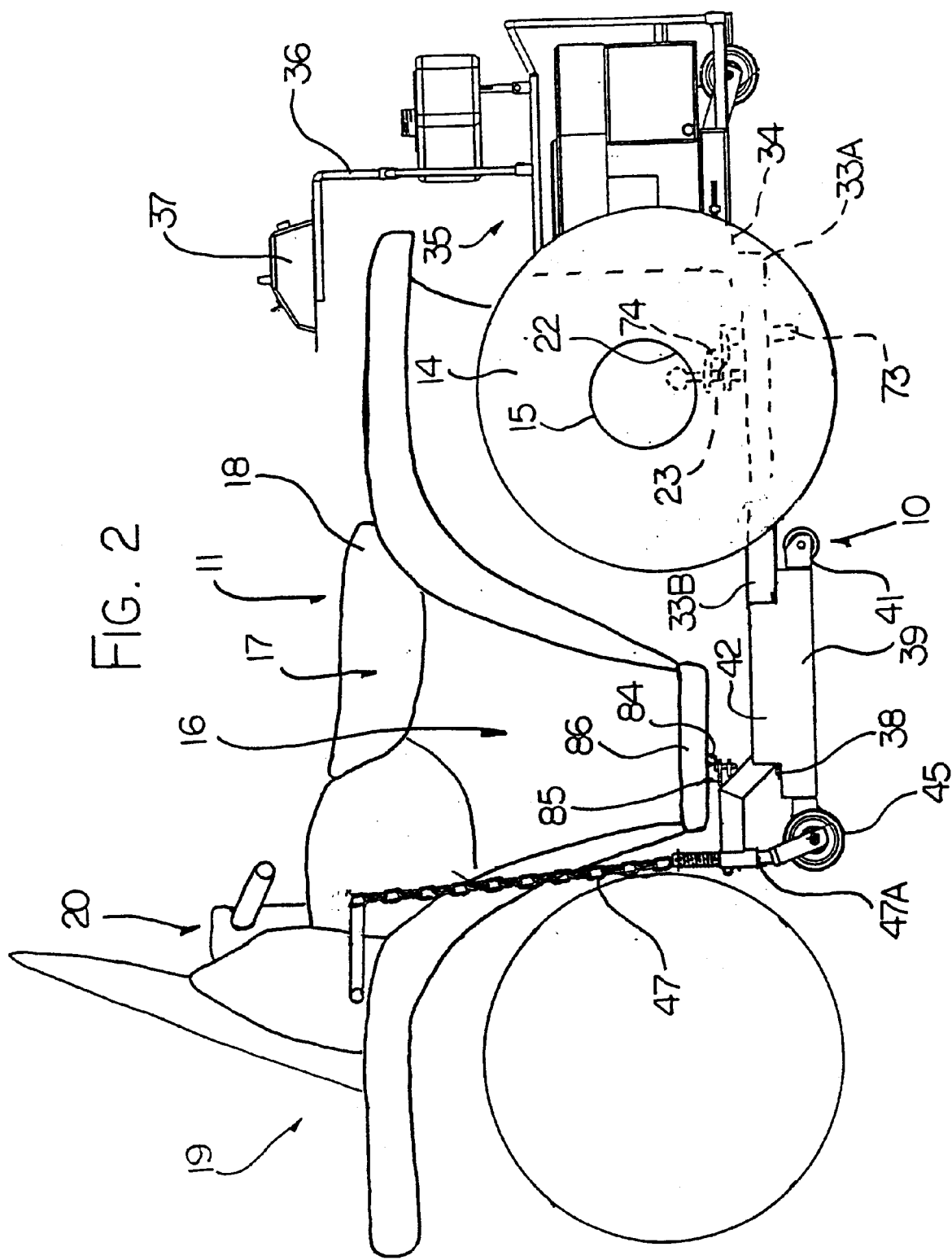
FIG. 2 is a side elevational view of the belly mower of FIG. 1 attached to an ATV type vehicle.
Figure 3:
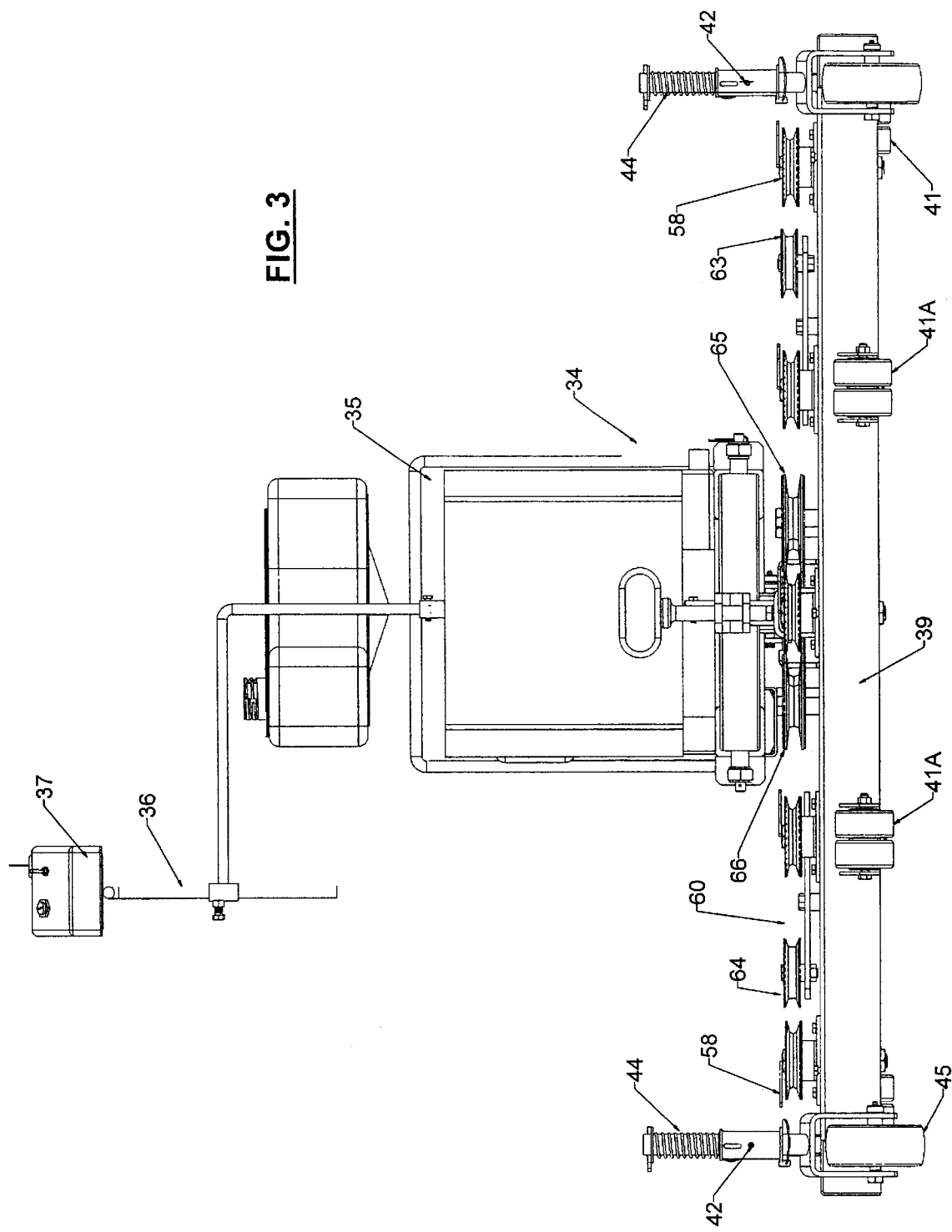
FIG. 3 is a front elevational view of the belly mower of FIG. 1.

The belly mower is generally indicated at 10 for mounting on an ATV type vehicle 11 as shown in FIG. 2. The ATV type vehicle includes a front wheel 12 mounted on a front axle 13 and a pair of rear wheels 14 mounted on a rear axle 15. The vehicle further includes a frame 16 supporting a saddle 17 for the rider. The vehicle includes a rear rack 18 and a front rack 19. A motor mounted on the frame provides drive to at least the rear axle 15 and preferably also to the front axle 13 for driving the wheels. The front and rear axle are mounted on suspension relative to the frame. The front axle is steerable by a handle bar control system 20 including conventional controls for the throttle, brakes and clutch. The rear axle 15 carries a bracket 22 to which is attached a hitch bar 23 extending horizontally rearwardly at the centre of the rear axle conventionally. for towing trailed equipment such as trailers.

Examples of vehicles of this type are manufactured by a number of different manufacturers and therefore specific details vary however they are generally of roughly the same dimensions so that the belly mower described hereinafter can be attached to any of the various vehicle types with their being provided sufficient adjustment to accommodate slight changes in dimension.

Figure 1:
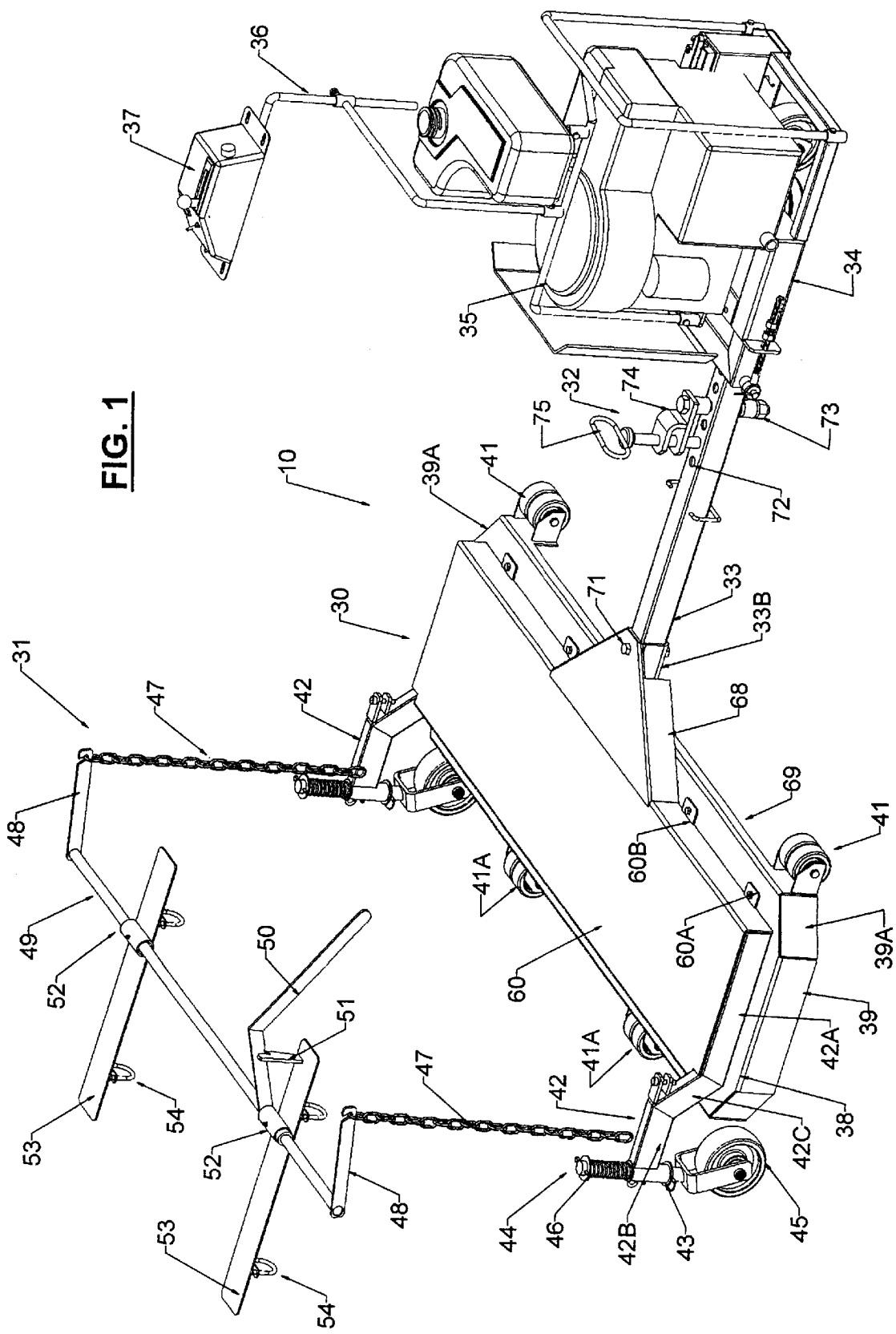
FIG. 1 is an isometric view of a belly mower according to the present invention separate from the vehicle.

As best shown in FIG. 1, the belly mower 10 comprises a mower deck generally indicated at 30 which is supported at a forward end on the vehicle by a front support system 31 and is supported at a rear end on the hitch of the vehicle by a mounting hitch assembly 32. The mounting hitch assembly 32 is attached to the deck 30 by an arm 33 which extends beyond the hitch assembly to a motor support 34 which carries a conventional commercially available combustion engine 35 for driving the mower. The mower support 34 includes a stanchion 36 which stands upwardly along one side of the support for mounting an operator control system 37 which is positioned as shown in FIG. 2 alongside the rear of the vehicle for manual operation by the rider of the vehicle.

In general, therefore, the belly mower is positioned between the front and rear wheels of the vehicle as best shown in FIG. 2 and projects outwardly to each side of the vehicle to provide a mowing action across the width of the vehicle which may project outwardly beyond the width of the vehicle depending upon the selected width of the deck.

The deck 30 comprises a horizontal support plate 38 which defines the width of the deck and also the front to rear dimension of the deck. The front and side edges of the horizontal plate include a depending skirt 39 which depends downwardly to a position adjacent the ground so as to confine material cut by the mower so as to be discharged rearwardly from a rear edge 40 of the deck. At the rear of the plate 38 along the edge 40 is defined a skirt of reduced height or there may indeed be no skirt at all so as to allow the cut material to discharge substantially across the full width of the deck. The mowing action thus avoids forming a swath of material but instead spreads the material evenly across. the width of the deck as the deck moves forwardly.

At the rear corners, the skirt 39 is inclined inwardly and rearwardly as indicated at 39A so that the rear edge 40 slightly narrower than the full width of the deck. Just inside the portion 39A of the skirt is provided a rear anti-scalping roller 41 which is mounted on a clevis attached to the skirt and extending rearwardly from the skirt. The roller thus contacts the ground at a position slightly lower than the bottom edge of the skirt with the intention that the roller does not generally support the full weight of the deck but instead merely slightly lifts the deck in the event that a crown in the ground surface provides an area of the ground so it is raised relative to the wheels of the vehicle thus bringing it closer to the mower blades with the possibility of scalping.

Figure 4:
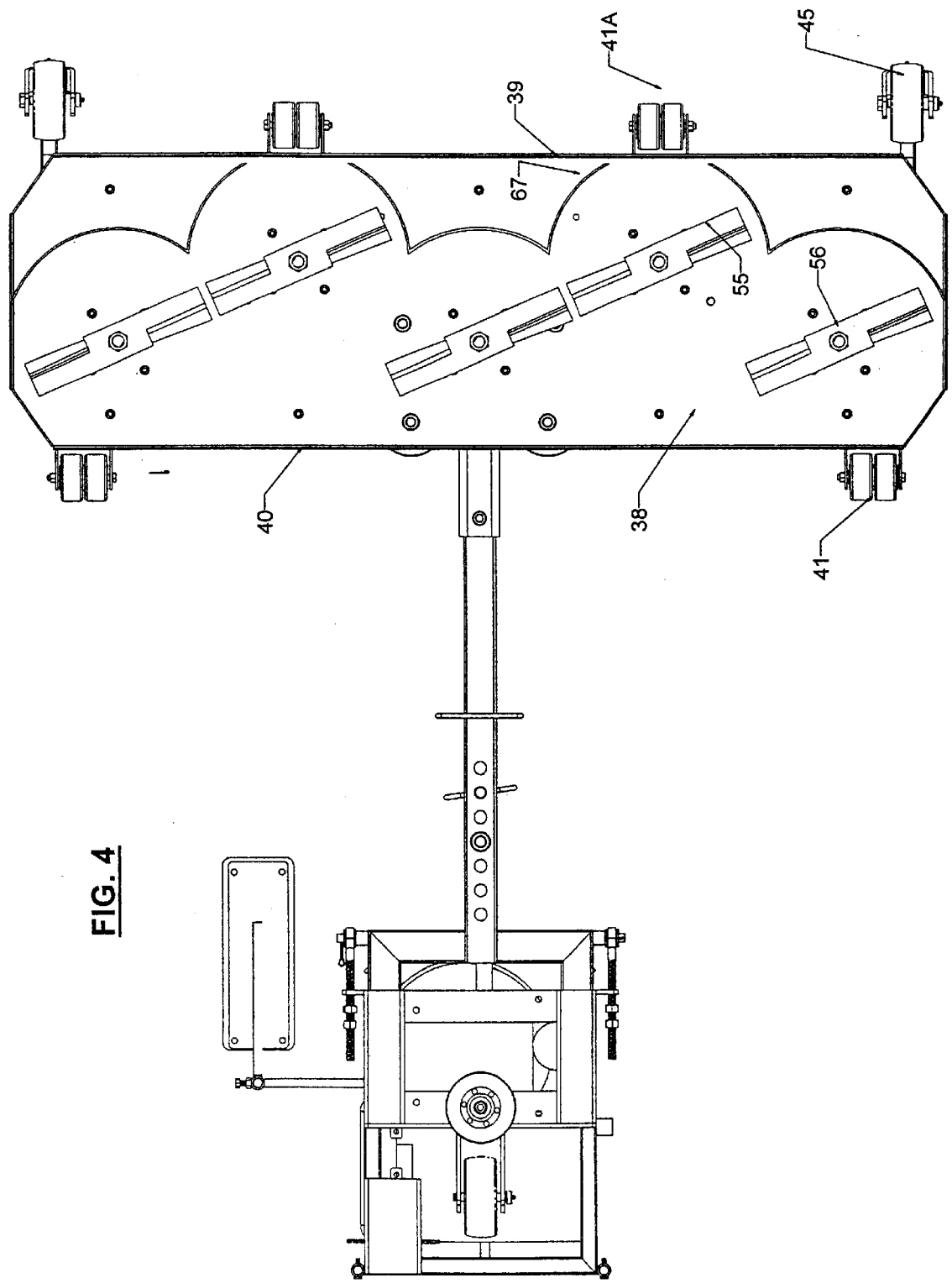
FIG. 4 is a bottom plan view of the belly mower of FIG. 1.
Figure 5:
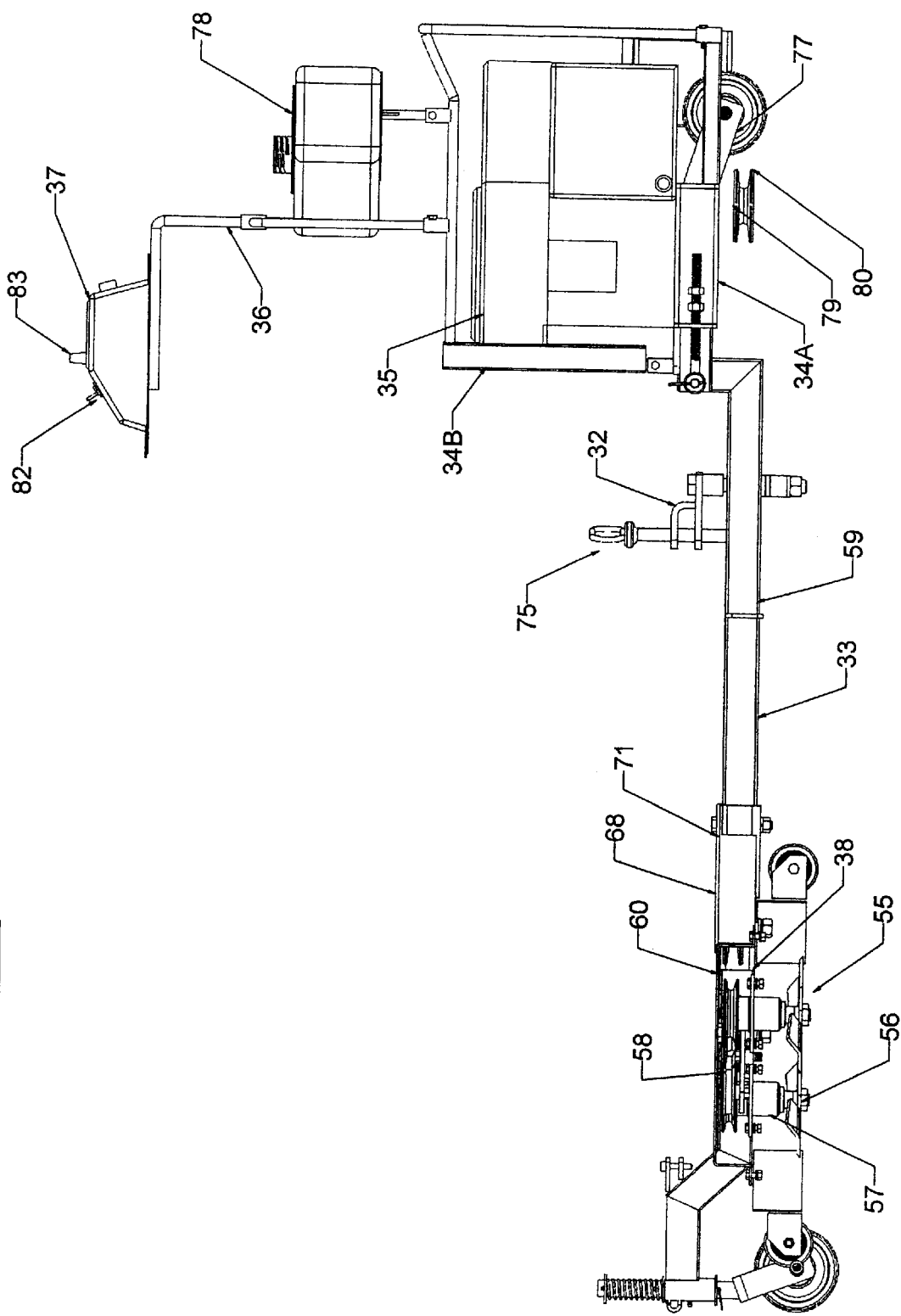
FIG. 5 is a side elevational view partly in cross-section through the belly mower of FIG. 1.

On top of the support plate 38 is a pair of forwardly extending support arms 42 each arranged adjacent to but spaced slightly inwardly from a respective side edge of the deck. Each arm extends to a rear end 42A adjacent the rear of the deck and extends therefrom forwardly generally parallel to the side edge of-the deck to a forward end 42B which is raised up above the deck by an inclined section 42C. As best shown in FIG. 4, the forward portion 42B of the arm is located slightly in front of the front edge of the deck. The forward end of the arm carries a sleeve 43 in which is mounted a sliding post 44 of a castor wheel 45 to provide support for the forward edge of the mower deck. The post 44 is mounted within the sleeve by a spring 46 which provides suspension of the wheels so that it can slide upwardly and downwardly to accommodate changes in ground elevation.

In addition the forward end of the deck is supported by suspension system 61 which comprises a pair of suspending chains 47 which are connected at lugs 47A on a forward end of the arms 42 and extend upwardly therefrom to a pair of support arms 48 which can be raised and lowered to effect raising and lowering of the forward end of the deck from the lowered operating position in which the wheels 45 roll on the ground to a raised transfer position in which the wheels are lifted away from the ground and thus the deck is carried away from the ground to allow the vehicle to be driven at higher speed from place to place.

The arms 48 are carried on a shaft 49 which extends across the width of the vehicle. The shaft can be rotated from the raised position shown to the lowered position by manual operation of a lever 50. In the raised position the lever is raised and sits on a saddle 51 to hold the deck in the raised position. When the lever 50 is lifted out of the saddle it can be lowered through approximately 30° so as to lower the arms 48 and thus move the deck onto the ground for the operating position.

The shaft 49 is carried in a pair of bushings 52 each mounted on a respective support strap 53 bridging the front rack 19 of the vehicle and attached thereto by U clamps 54. Thus the lever 50 is presented to the driver of the vehicle from the front rack over the handle bars and can be readily raised and lowered thus simultaneously lifting and lowering the two sides of the deck.

The front skirt also carries two anti scalping rollers 41A similar to the rollers 41 and projecting forwardly from the front skirt and spaced inwardly from the wheels 45.

The horizontal sport plate 38 carries the mower blades at spaced positions across the width of the plate. As best shown in FIG. 4, there are five blades on the underside of the plate 38 spaced generally across the width of the plate with the two outermost and the central one of the blades being located at a position rearward of the two intermediate blades so as to provide an effective overlap between the blades in the cutting action. Each blade 55 is mounted on a respective support shaft 56 carried in bearings 57 mounted on the plate 38. The shaft projects to a position above the plate 38 at which it carries a drive pulley 58 for driving by a belt 59. The drive pulleys of all of the five blades are mounted in the common horizontal plane above the plate 38 for driving by a single belt which wraps around each of the pulleys in turn together with idler pulleys and a drive pulley as described hereinafter.

The pulleys 58 and the belt 59 are covered by a removable cover plate 60 which is fastened by screws 61 passing through tabs 62 attaching the cover plate and particularly its front and rear skirts to the support plate 38. Thus the cover plate 60 is parallel to the support plate 38 and spaced by a distance sufficient just to receive the pulleys and the belt.

The fact that the blades are all driven by a single belt so that each shaft carries only a single pulley. This acts to minimize the length of each shaft and thus minimize the distance between the top of the plate 38 and the cover plate 60 thus minimizing the total height of the deck. In this way the deck can be located underneath the vehicle which has lower clearance than the type of vehicle specifically designed for a belly mower such as a yard tractor.

Figure 6:
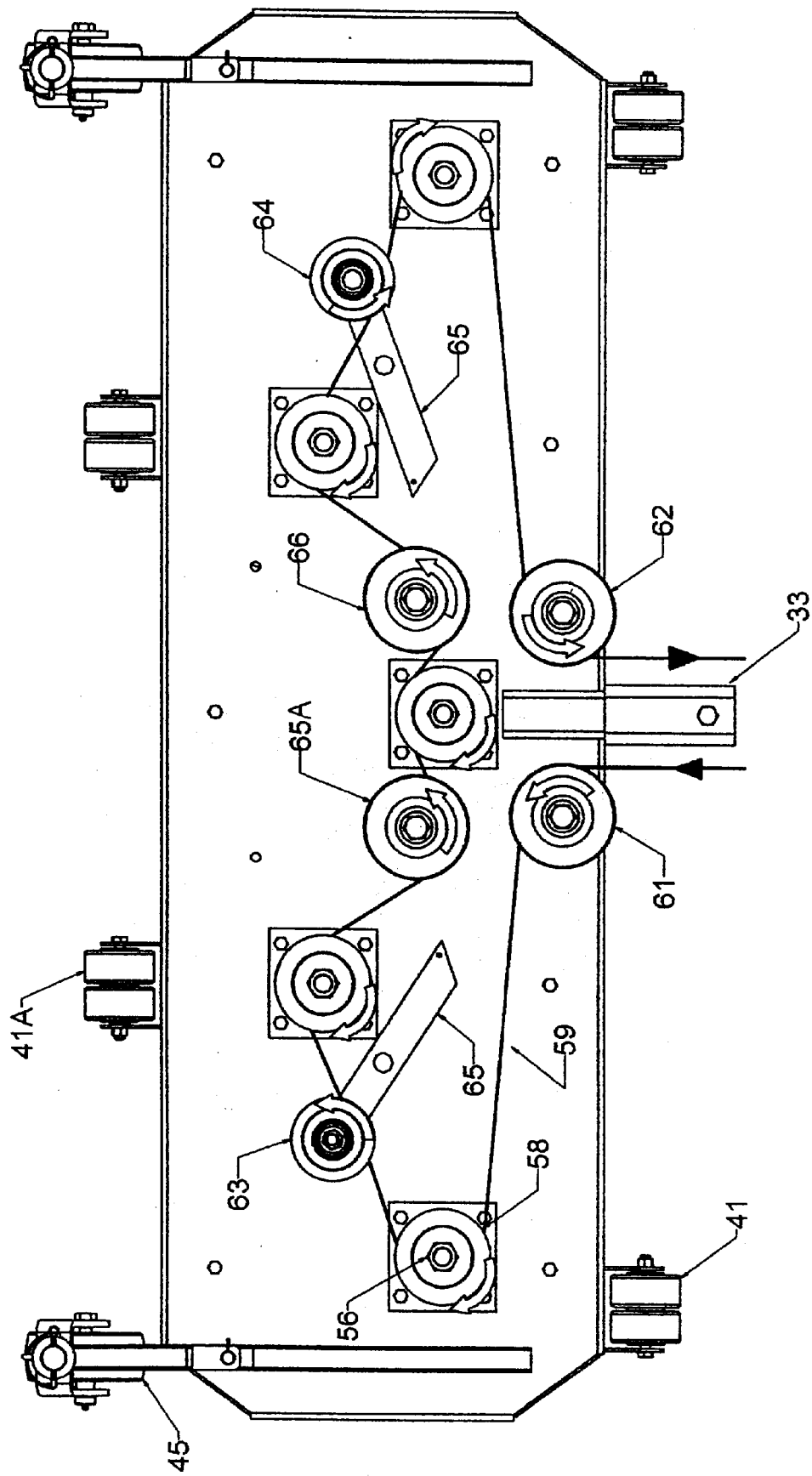
FIG. 6 is a view showing the path of the belt driving the pulleys of the mower blades.

As shown in FIG. 6, the belt 59 enters under the plate 60 at the rear edge so that a drive run and a return run of the belt pass along respective sides of the arms 33 into the deck. Each run of the belt passes round an idler roller 61, 62 respectively and extends therefrom outwardly to the outermost pulley 58. The belt then wraps around a tensioner idler pulley 63, 64 mounted on a pivot arm 65 which is spring tensioned to apply a tensioning force onto the belt as it passes between the outermost pulley and the pulley on the forward intermediate blades. The belt then passes from the intermediate blades around a second idler pulley 66, 66A and around the pulley of the central blade. In this way the blades are all driven in the same direction and the belt provides sufficient angle of wrap around each pulley to effectively drive each of the blades.

In addition to the front skirt 39, the deck also includes arcuate skirt portions in front of each blade as indicated at 67 in FIG. 4. Thus the material chopped by each blade is generally confined to move rearwardly from the blade through the rear edge 40 across the full width of the deck.

The arm 33 is removably inserted into a sleeve 33B fastened to the support plate 38 at a position midway across the plate and extends therefrom rearwardly. The attachment of the arm 33 to the deck is supported by a gusset plate 68 which lies in a common plane with the cover plate 60. The gusset plate extends outwardly to each side of the arm and includes a depending skirt portion 69. The gusset plate is bolted to the sleeve 33B and to the plate 38 by a bolt 70 and the gusset plate is bolted to the arm 33 by a second bolt 71 spaced outwardly from the plate 38.

The arm 33 can be removed from the sleeve 33B to allow the assembly to be collapsed for storage or shipping. The arm 33 includes a plurality of vertical holes 72 into which the hitch assembly 33 can be engaged. The hitch assembly includes a vertical mounting pin 73 at the top of which is attached a forwardly extending clevis 74 for engagement with the plate 23 of the hitch. The clevis carries a hitch pin 75 which engages downwardly through two holes in the clevis and an aligned hole in the hitched plate 23.

The height of the clevis 74 can be adjusted by a vertical adjustment of the pin 73. The forward to rearward location of the clevis 74 can be adjusted by selecting respective ones of the hole 72 in the arm 33. Thus the hitch clevis 74 can be located at a suitable position relative to the dimensions of the vehicle so that the deck is located properly between the front and rear wheels with sufficient clearance between both to allow the mower to operate effectively in the belly mount position. The hitch assembly also provides sufficient pivotal movement of the arm 33 relative to the hitch of the vehicle so that the deck can accommodate the vertical movement necessary to move from operating to transport position without the necessity for adjustment of the hitch. Thus a slight upward and downward pivoting movement about a horizontal axis through the hitch assembly to accommodate this vertical movement.

Behind the hitch assembly 32 is provided the support 34 for the drive motor 35. The support comprises a rectangular horizontal frame which is attached to the rear end of the arm 33 at a raised vertical portion 33A so that the bottom of the motor mount 34 is at a slightly raised height relative to the arm 33.

Within the frame 34A defining the motor mount is provided a ground wheel 77 which projects downwardly from the underside of the frame 34A sufficiently so as to prevent engagement of the rear end of the arm and the frame 34A with the ground in the event that the ground is raised at a position behind the rear wheels of the vehicle.

The frame 34A includes raised frame members 34B which stand upwardly from the horizontal base section to provide protection around the engine 35 and to provide support for a fuel tank 78. The stanchion 36 also projects upwardly from the frame members 34B.

The motor 35 is of a conventional commercially available construction and therefore will not be described in detail. The motor includes the various components necessary for providing output power to an output shaft 79 projecting vertically downwardly underneath the frame 34A. A drive pulley 80 is mounted on the shaft at a height so as to lie in a common plane with the arm 33 and with the pulleys 58 so that the belt 59 lies in a horizontal plane extending along the sides of the arm 33.

The shaft 79 is driven through an electric clutch assembly 81 so that the pulley drive can be halted while engine continues to run by actuation of the clutch 81. The electric clutch is controlled by a switch. 82 on the manually operable control unit. The speed of the engine is controlled by a throttle linkage operated by a hand controlled lever 83 on the control systems 37. Thus the operator while seated on the ATV can operate the mower both by controlling the speed of the drive pulley and therefore the speed of the blades and by halting the operation of the blades. Suitable for safety switches may also be included to halt operation in the event that the driver leaves the seat.

The mower is prevented from side to side movement by two chains 84 each connected by a respective lug 85 to a rear end of the top portion 42B of the arm 42. The chains each extend from the lug 85 upwardly and inwardly to a suitable connection on the vehicle such as the foot peg or foot support 86, where the chains can be attached to be held substantially taut.

The mower can be readily released from the vehicle simply by pulling the hitch pin 75 and by releasing the chains 47, following the vehicle can drive over the deck in the forward direction leaving the mower behind for storage. Similarly the vehicle can be attached to the mower by reversing the vehicle over the deck so that the rear wheels pass over the deck following which the hitch coupling is attached to the hitch of the vehicle and the chains are connected to allow the deck to be moved forwardly with the engine behind the vehicle and the bellow mower between the wheels of the vehicle. The hitch provides a forward propulsion movement of the mower while side to side movement of the mower is prevented or reduced by the chains 47.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A belly mower for attachment to a separate vehicle including a vehicle motor for driving the vehicle, at least one front wheel and at least one rear wheel, the belly mower comprising:

a mower frame having a mower deck;

a plurality of blades mounted on the mower deck such that forward movement of the mower deck across the ground causes the blades to effect a cutting action of a crop growing on the ground, each blade being rotatable on a respective vertical mounting shaft about a substantially vertical axis at horizontally spaced positions across the mower deck;

the mower frame including mounting members for attachment of the mower frame and the mower deck to the separate vehicle such that forward movement of the vehicle moves the mower deck forwards;

the mower deck and the mounting members being shaped arranged such that in use the mower deck is located and maintained behind at least one front wheel of the vehicle and in front of at least one rear wheel of the vehicle;

the mower frame including a portion thereof extending longitudinally of and separately from the vehicle from the mower deck in front of the rear wheels so as to extend in use to a position rearwardly of the vehicle;

a motor mounted on said portion of the mower frame at a position rearwardly of the vehicle and operable to generate power independently of the motor of the vehicle to drive the blades, the mower frame with the motor thereon being removable from the vehicle leaving the vehicle free from the belly mower for driving by the vehicle motor;

and a drive connection which extends from the motor to the drive shafts of the blades on the mower deck for driving the blades.

2. The mower according to claim 1 wherein the motor includes a vertical drive shaft for driving the blades including a horizontal drive pulley mounted on the vertical drive shaft such that the drive pulley is carried with the motor on the mower frame;

wherein there is provided a belt engaged around the horizontal drive pulley and extending therefrom to the mower deck for driving the blades;

wherein each mounting shaft includes a respective single horizontal driven pulley thereon where the driven pulleys of all of the mounting shafts lie in a common horizontal plane;

and wherein the belt extends in the common horizontal plane from the horizontal drive pulley on the vertical drive shaft around each in turn of the drive pulleys of all of the blades.

3. The mower according to claim 2 wherein the deck includes a horizontal mounting plate on which the mounting shafts are mounted for rotation about vertical axes passing through the mounting plate with the blades underneath the mounting plate and the pulleys above the mounting plate, all of the pulleys and the belt being covered by a common rigid cover plate parallel to the mounting plate and arranged such that the rear wheels can drive over the cover plate to locate the mower deck between the front and rear wheels.

4. The mower according to claim 1 wherein the mounting members include a hitch coupling attached to said portion of the mower frame and arranged for attachment to a rear hitch of the vehicle by which the mower frame and the deck are attached to the vehicle such that forward movement of the vehicle causes the hitch coupling to apply forward movement to the mower deck and to maintain the mower deck between the front and rear wheels.

5. The mower according to claim 4 wherein the mounting members include flexible connecting couplings each on a respective side of the mower deck and each arranged to extend from a forward part of the mower deck to an adjacent part of the vehicle to prevent side to side movement of the mower deck relative to the vehicle while forward movement of the mower deck is provided by said hitch coupling.

6. The mower according to claim 4 wherein said portion of the frame comprises a single arm connected at a forward end to the mower deck and carrying said motor at a rearward end and including said hitch coupling standing upwardly from the arm at a position thereon intermediate the ends.

7. The mower according to claim 1 wherein said portion of the frame includes a wheel at a rear end thereof arranged to be raised from the ground and carried on the portion of the frame and arranged for engaging the ground.

8. A belly mower for attachment to a separate vehicle including a vehicle motor for driving the vehicle, at least one front wheel and at least one rear wheel, the belly mower comprising:

a mower frame having a mower deck;

a plurality of blades mounted on the mower deck such that forward movement of the mower deck across the ground causes the blades to effect a cutting action of a crop growing on the ground, each blade being rotatable on a respective vertical mounting shaft about a substantially vertical axis at horizontally spaced positions across the mower deck;

the mower frame including mounting members for attachment of the mower frame and the mower deck to the separate vehicle such that forward movement of the vehicle moves the mower deck forwards;

the mower deck and the mounting members being shaped arranged such that in use the mower deck is located and maintained behind at least one front wheel of the vehicle and in front of at least one rear wheel of the vehicle;

the mower frame including a portion thereof extending longitudinally of and separately from the vehicle from the mower deck in front of the rear wheels so as to extend in use to a position rearwardly of the vehicle;

a motor mounted on said portion of the mower frame at a position rearwardly of the vehicle and operable to generate power independently of the motor of the vehicle to drive the blades, the mower frame with the motor thereon being removable from the vehicle leaving the vehicle free from the belly mower for driving by the vehicle motor;

a drive connection which extends from the motor to the drive shafts of the blades on the mower deck for driving the blades;

and a control system including a manually operable control unit operable by a person seated on the vehicle for controlling the driving of the at least one blade by the motor and a mounting stand for the control unit attached to said portion of the mower frame at the position rearwardly of the vehicle, the mounting stand extending from said portion to a position alongside the vehicle for operation of the control unit by the seated person.

9. The mower according to claim 8 wherein the mounting stand extends from said portion of the frame upwardly, to one side and forwardly so as to locate the control unit at the side of the seated person.

10. The mower according to claim 8 wherein the mounting members include a hitch coupling attached to said portion of the mower frame and arranged for attachment to a rear hitch of the vehicle by which the mower frame and the deck are attached to the vehicle such that forward movement of the vehicle causes the hitch coupling to apply forward movement to the mower deck and to maintain the mower deck between the front and rear wheels.

11. The mower according to claim 10 wherein said portion of the frame comprises a single arm connected at a forward end to the mower deck and carrying said motor at a rearward end and including said hitch coupling standing upwardly from the arm at a position thereon intermediate the ends.

12. The mower according to claim 11 wherein said portion of the frame includes a wheel at a rear end thereof arranged to be raised from the ground and carried on the portion of the frame and arranged for engaging the ground.

13. A belly mower for attachment to a separate vehicle including a vehicle motor for driving the vehicle, at least one front wheel and at least one rear wheel, the belly mower comprising:

a mower frame having a mower deck;

a plurality of blades mounted on the mower deck such that forward movement of the mower deck across the ground causes the blades to effect a cutting action of a crop growing on the ground, each blade being rotatable on a respective vertical mounting shaft about a substantially vertical axis at horizontally spaced positions across the mower deck;

the mower frame including mounting members for attachment of the mower frame and the mower deck to the separate vehicle such that forward movement of the vehicle moves the mower deck forwards;

the mower deck and the mounting members being shaped arranged such that in use the mower deck is located and maintained behind at least one front wheel of the vehicle and in front of at least one rear wheel of the vehicle;

the mower frame including a portion thereof extending longitudinally of the vehicle from the mower deck so as in use to extend to a position beyond the vehicle;

a motor mounted on said portion of the mower frame at a position outboard of the vehicle and operable to generate power independently of the motor of the vehicle to drive the blades, the mower frame with the motor thereon being removable from the vehicle leaving the vehicle free from the belly mower for driving by the vehicle motor;

the motor including a vertical drive shaft for driving the blades including a horizontal drive pulley mounted on the vertical drive shaft such that the drive pulley is carried with the motor on the mower frame a belt engaged around the horizontal drive pulley and extending therefrom to the mower deck for driving the blades;

wherein each mounting shaft includes a respective single horizontal driven pulley thereon where. the driven pulleys of all of the mounting shafts lie in a common horizontal plane;

and wherein the belt extends in the common horizontal plane from the horizontal drive pulley on the vertical drive shaft around each in turn of the drive pulleys of all of the blades.

14. The mower according to claim 13 wherein the deck includes a horizontal mounting plate on which the mounting-shafts are mounted for rotation about vertical axes passing through the mounting plate with the blades underneath the mounting plate and the pulleys above the mounting plate, all of the pulleys and the belt being covered by a common rigid cover plate parallel to the mounting plate and arranged such that the wheels can drive over the cover plate to locate the mower deck.

15. A belly mower for attachment to a vehicle comprising:

a mower frame having a mower deck;

at least one blade mounted on the mower deck such that forward movement of the mower deck across the ground causes the blade to effect a cutting action of a crop growing on the ground;

the mower deck being shaped and arranged such that in use it is located behind at least one front wheel of the vehicle and in front of at least one rear wheel of the vehicle;

the mower frame including a support arm arranged to extend longitudinally rearwardly of the vehicle from the mower deck to a position behind the vehicle;

the support arm having attached thereto a hitch coupling for attachment to a rear hitch of the vehicle by which the mower frame and the deck are attached in use to the vehicle, the hitch coupling and the support arm being arranged such that forward movement of the vehicle moves the mower deck forwards and maintains the mower deck between the front and rear wheels.

16. The mower according to claim 15 wherein the hitch coupling is arranged such that the deck is propelled. forwardly by the hitch coupling and wherein the mower frame includes a second mounting member extending from a forward part of the mower deck to an adjacent part of the vehicle to prevent side to side movement of the mower deck relative to the vehicle.

* * * * *